(12) United States Patent
Marcolin

(10) Patent No.: US 7,472,723 B2
(45) Date of Patent: Jan. 6, 2009

(54) TUBE FOR CONVEYING FLUIDS AND METHOD FOR ITS PRODUCTION

(75) Inventor: Pietro Marcolin, Due Carrare (IT)

(73) Assignee: Manifattura Tubi Gomma S.p.A., Grisignano di Zocco (Vincenza) (IT)

( * ) Notice: Subject to any disclaimer, the term of this patent is extended or adjusted under 35 U.S.C. 154(b) by 716 days.

(21) Appl. No.: 10/802,057

(22) Filed: Mar. 17, 2004

(65) Prior Publication Data

US 2005/0205149 A1    Sep. 22, 2005

(51) Int. Cl.
*F16L 11/00* (2006.01)

(52) U.S. Cl. .................. 138/125; 138/141; 138/137; 138/140; 138/DIG. 7; 428/36.91

(58) Field of Classification Search ................ 138/137, 138/140, 141, 126, 125, 133, 132, 172; 428/36.91, 428/36.9
See application file for complete search history.

(56) References Cited

U.S. PATENT DOCUMENTS

| | | | |
|---|---|---|---|
| 2,906,658 A | | 9/1959 | Doban |
| 3,047,421 A | | 7/1962 | Taylor |
| 3,709,776 A | | 1/1973 | Fuchs et al. |
| 3,866,631 A | * | 2/1975 | Chudgar ............... 138/125 |
| 3,982,982 A | * | 9/1976 | Chudgar ............... 156/143 |
| 4,102,724 A | * | 7/1978 | Taylor ................. 156/149 |
| 4,145,325 A | * | 3/1979 | Vassiliou et al. ........... 524/398 |
| 5,556,676 A | * | 9/1996 | Fukumoto ............... 428/36.1 |
| 5,573,039 A | * | 11/1996 | Mang .................. 138/141 |
| 5,622,210 A | * | 4/1997 | Crisman et al. ........... 138/104 |
| 6,390,141 B1 | * | 5/2002 | Fisher et al. ............ 138/137 |
| 2002/0112770 A1 | | 8/2002 | Fischer et al. |

FOREIGN PATENT DOCUMENTS

| | | |
|---|---|---|
| EP | 1260747 A1 | 11/2002 |
| GB | 793731 | 4/1958 |

\* cited by examiner

*Primary Examiner*—Patrick F Brinson
(74) *Attorney, Agent, or Firm*—Browdy and Neimark P.L.L.C.

(57) ABSTRACT

Tube for conveying fluids comprising a plurality of concentric layers (2), an inner layer (3) constituting a conduit (3a) for a fluid to be conveyed, and at least an outer layer (5) for protection and reinforcement mounted externally to the inner layer (3), in which the inner layer (3) is pigmented and mainly made of a fluoridated polymer chosen between MFA and PFA. The tube (1) further comprises at least an adhesive (6) interposed between the outer layer (5) and the inner layer (3).

The present invention also relates to a method for the production of said tube (1), comprising the following steps: subjecting an outer surface (4) of the inner layer (3) to a cementing process, subsequently applying an adhesive (6) to the outer surface (4), and coating the outer surface (4) with at least an outer layer (5). The cementing process takes place by at least partial defluorisation of the outer surface (4) of the inner layer (3).

16 Claims, 1 Drawing Sheet

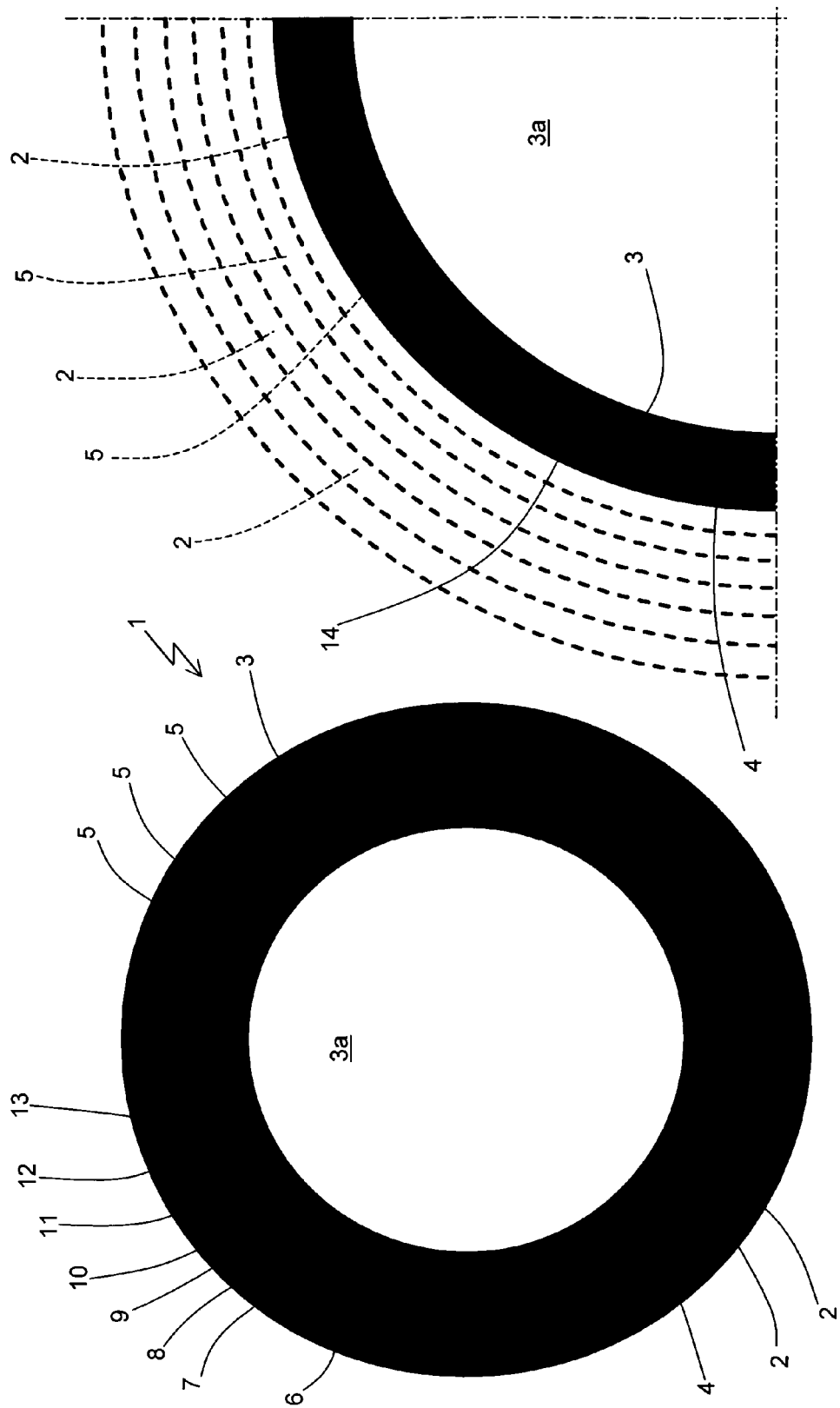

TUBE FOR CONVEYING FLUIDS AND METHOD FOR ITS PRODUCTION

TECHNICAL FIELD

The present invention relates to a tube for conveying fluids as well as a method for the production of said tube.

In many sectors, multi-layer composite tubes are used to convey a fluid, from a supply source, to filling devices which fill with the fluid itself containers destined to be placed on the market.

By way of example, industries where ample use of such tubes is made are the pharmaceutical industry, the cosmetics industry and the food industry.

In parallel, similar tubes are also applied in other apparatuses in which fluids need to be transported.

BACKGROUND OF THE INVENTION

Currently, the tubes are constituted by an inner layer which defines the passage conduit for the fluid, and by one or more outer layers superposed to the inner layer and made integral therewith.

Typically, the outer layers can be constituted by fabric, rubber, metallic spirals for reinforcement and/or protection, various filling materials, etc. . . .

Depending on the applications, one or more layers constituting the tube may be made of a conductive material, to discharge any electrostatic charges generated with the passage of the fluid. This solution is necessary when the tubes are destined to be used in environments in which flammable and/or explosive materials are present, or when the fluid to be conveyed is flammable and/or explosive.

In regard to the inner layer, it is currently made of silicone, or in fluoridated polymers such as FEP and PTFE, and its thickness may vary between 1 and 2 mm.

In many applications (in particular in the industries mentioned above), the inner conduit for the passage of the fluid must be white. This requirement is well met by conduits with thickness exceeding 1 mm made of materials such as PTFE which by nature are translucent. Given their high thickness, the colour of the conduit appears to be white.

The choice of thickness of 1 or 2 mm is in any case dictated by reasons of a mechanical nature, given that, at least to date, it has not been possible to produce conduits of smaller thickness having sufficient mechanical resistance.

The production of tubes of the type described above starts from the inner conduit which is first of all externally subjected to a process called cementing whose purpose is to increase its "roughness" (in this case meant more at the molecular than macroscopic level), then treated with a product that acts as an adhesive and binds to the outer, "rough" surface of the inner layer itself.

Subsequently, the outer layers are applied in succession according to the needs dictated by the intended use of the tubes.

Said known type of tubes, however, has a high mechanical rigidity, due mainly to the high thickness of the inner conduit, which substantially prevents bending the tube.

This prevents use of such tubes in combination with movable devices, which in some cases can be the filler heads of filling machines.

Another known type of tubes is represented by tubes lacking outer coating, thus constituted by the inner conduit only.

Although said tubes too are made of the same materials indicated for the inner conduit of the multilayer tubes, recently others have been developed, made of modified fluoridated polymeric materials, known as MFA (polytetrafluoroethylene-perfluoromethylvinylether) and PFA (polytetrafluoro-ethylene-co-perfluorine(alkylvinylether)).

These two polymeric materials have such characteristics as to allow making tubes with a thickness of even 0.2 mm, which nonetheless assure excellent mechanical strength, excellent impermeability, and can convey even highly aggressive fluids, without releasing or absorbing any element.

Such materials are transparent and with the cementing process they take on a dark colour; thus, the pigmentation of the tubes during their production is always necessary to make them white.

While such materials do have advantageous characteristics, heretofore they have not been considered suitable to obtain multilayer composite tubes, since at present no effective cementing operation can be performed on pigmented elements made of MFA or PFA. A cementing operation is indispensable to allow the adhesion of the outer layers to the inner conduit.

SUMMARY OF THE INVENTION

In this situation, the technical task constituting the basis for the present invention is to obtain a multilayer tube for conveying fluids which overcomes the aforementioned drawbacks.

In particular, a technical task of the present invention is to provide a multilayer tube for conveying fluids in which the inner conduit is made of MFA or PFA.

Another technical task of the present invention is to offer a method for producing multilayer tubes for conveying fluids which is free from the aforesaid drawbacks.

A further technical task of the present invention is to provide a method for producing multilayer tubes in which the inner conduit is made of MFA or PFA.

The specified technical task and the indicated aims are substantially achieved by a tube for transporting fluids and by a method for its production, as described in the accompanying claims.

BRIEF DESCRIPTION OF THE DRAWINGS

Additional characteristics and the advantages of the present invention shall become more readily apparent from the detailed description of an exemplifying, but not exclusive, embodiment, of a tube for conveying fluid, illustrated in the accompanying drawings, in which:

FIG. 1 shows a schematic tube for conveying fluids, produced according to the present invention;

FIG. 2 shows an enlarged detail of the tube of FIG. 1 with some parts removed the better to highlight others.

DETAILED DESCRIPTION OF THE INVENTION

With reference to the aforementioned figures, the reference number 1 globally indicates a tube for conveying fluids according to the present invention, which generally comprises a plurality of concentric layers 2 starting from an inner layer 3 which constitutes a conduit 3a for the fluid to be conveyed.

The inner layer 3 is mainly made of a fluoridated polymer chosen between MFA and PFA, appropriately pigmented, advantageously white.

The inner layer 3 has an outer surface 4 which, after being subjected to a cementing process (illustrated hereafter), has a certain "roughness". This concept shall be clarified better below.

The inner layer 3, in the preferred embodiments, has a thickness which may vary between 0.2 and 0.5 mm.

Externally to the inner layer 3 is also fastened at least an outer layer 5 for protection and reinforcement.

An adhesive 6 (normally called Primer and shown schematically in the accompanying figures as an additional layer, though it is normally constituted by a very think film adhering to the outer surface 4 of the inner layer 3) is interposed between the outer layer 5 and the inner layer 3, in order to assure adhesion between the two.

In the embodiment illustrated herein, purely by way of example, the tube 1 comprises a plurality of concentric outer layers 5.

In particular, starting from the adhesive 6 one encounters a fabric layer 7, a metallic spiral 8, a layer of filling material 9, two more fabric layers 10, 11, an additional layer of filling material 12 and a covering layer 13.

In regard to the succession of the outer layers 5, many variations are provided, each intended for a specific use.

In particular, for tubes destined to the pharmaceutical and cosmetic industries, the covering layer 13 is light coloured (preferably white), an the other layers 2 must also be in the lightest possible colour.

For tubes destined to other sectors, moreover, at least one of the layers 2 constituting the tube 1 to be conductive, in order to discharge any electrostatic charges. This arrangement is necessary in particular when either the conveyed fluid or the environment surrounding the tube 1 itself are easily flammable if not explosive.

An additional variation is that of tubes 1 destined for dynamic applications (for instance in combination with movable filler heads of filling machines). In this case the tube 1 is produced in such a way as to maximise its flexibility. For this purpose, the thickness of the inner layer 3 assumes reduced values, and any stiffening spirals are also minimised.

As stated, the present invention also relates to a method for producing tubes for conveying fluids, of the type described so far.

The production of a tube 1 starts from a pre-formed conduits 3a (for instance by extrusion) made of MFA or PFA and having the desired thickness.

The outer surface 4 of the conduit 3a is then subjected to a cementing process that determines at least the partial defluorisation of the outer surface 4 itself.

According to the preferred embodiment of the present invention, the cementing of the outer surface 4 is obtained by immersing the outer surface 4 itself in a sodium and ammonia based bath with predetermined time of permanence and temperature.

The concentration of the bath, as well as the temperature and duration thereof, must from time to time be determined according to the constitution of the material with which the inner layer 3 is formed, of the dimensions of the tube 1 and of the degree of cementing to be obtained.

From the degree of cementing depends the grip exerted on the inner layer 3 by the adhesive 6; for this reason the degree of cementing must be determined according to the intended use of the tube 1.

Depending on the mechanical stresses whereto the tube 1 will be subjected in use, a more or less secure adhesion of the outer layers 2 on the inner layer is necessary.

After the necessary time, the inner conduit 3a is then extracted from the bath and washed with water.

Following this step, the defluorised outer surface 4 a certain "roughness" (at the molecular level).

Note, that the products required to complete the cementing operation (sodium and ammonia) are relatively easy to obtain.

The second step for the production of the tube 1 entails applying onto the outer surface 4 a substance (known in the industry as Primer) which acts as an adhesive 6 and which adheres to the outer surface 4 of the inner conduit 3a, thanks to the "roughness" thereof. In particular the adhesive binds onto the outer surface 4 in correspondence with the molecular gaps left by the fluorine atoms extracted by means of the cementing process.

Subsequently the outer surface 4 is coated with at least an outer layer 5, although in general there is a plurality of outer layers 5, the first of which is locked in position by the adhesive substance 6.

The layers 2 subsequent to the first one are then applied in succession one on the other in known manners.

The present invention achieves important advantages.

In the first place, multilayer tubes produced in accordance with the present invention have an inner conduit made of pigmented MFA or PFA.

Consequently, for a chemical strength substantially corresponding to that of traditional tubes, they have reduced thickness relative to traditional tubes, with consequent advantages in terms of flexibility and weight, as well as a better mechanical resistance to repeated cycles and high internal slipperiness accompanied by an equally high impermeability and resistance to moulds.

Their great flexibility allows to use such tubes also to join parts of apparatuses in motion with respect to one another.

The tubes produced in accordance with the present invention also have a far longer working life than traditional tubes, which amply offsets their slightly higher cost.

The invention thus conceived can be subject to numerous modifications and variations, without thereby departing from the scope of the inventive concept that characterises it.

All components can be replaced by other technically equivalent elements, and the shapes and dimensions of the various components can be any depending on requirements.

What is claimed is:

1. Tube for conveying fluids, comprising a plurality of concentric layers (2), an inner layer (3) constituting a conduit (3a) for a fluid to be conveyed, and at least an outer layer (5) for protection and reinforcement, mounted externally to said inner layer (3), wherein said inner layer (3) is mainly made from a fluoridated polymer chosen between MFA and PFA, said fluoridated polymer being also pigmented; and wherein the inner layer is roughened by means of at least partial defluorination of the surface on which the outer layer is mounted.

2. Tube as claimed in claim 1 characterised in that wherein said inner layer (3) is pigmented white.

3. Tube as claimed in claim 1 wherein the tube further comprises at least an adhesive (6) interposed between the outer layer (5) and the inner layer (3).

4. Tube as claimed in claim 2 wherein the tube further comprises at least an adhesive (6) interposed between the outer layer (5) and the inner layer (3).

5. Tube as claimed in claim 1, wherein the tube comprises a plurality of concentric outer layers (2).

6. Tube as claimed in claim 5 wherein at least one of said outer layers (2) is constituted by a metallic reinforcing spiral.

7. Tube as claimed in claim 5 wherein at least one of said layers (2) is conductive.

8. Tube as claimed in claim 2, wherein the tube comprises a plurality of concentric outer layers (2).

9. Tube as claimed in claim 8 wherein at least one of said outer layers (2) is constituted by a metallic reinforcing spiral.

10. Tube as claimed in claim 8 wherein at least one of said layers (2) is conductive.

11. Tube as claimed in claim 3, wherein the tube comprises a plurality of concentric outer layers (2).

12. Tube as claimed in claim 11 wherein at least one of said outer layers (2) is constituted by a metallic reinforcing spiral.

13. Tube as claimed in claim 11 wherein at least one of said layers (2) is conductive.

14. Tube as claimed in claim 4, wherein the tube comprises a plurality of concentric outer layers (2).

15. Tube as claimed in claim 14 wherein at least one of said outer layers (2) is constituted by a metallic reinforcing spiral.

16. Tube as claimed in claim 14 wherein at least one of said layers (2) is conductive.

* * * * *